United States Patent [19]

Marhevka et al.

[11] Patent Number: 5,712,039

[45] Date of Patent: Jan. 27, 1998

[54] EPOXY ADHESIVES WITH DITHIOOXAMIDE ADHESION PROMOTERS

[75] Inventors: Virginia C. Marhevka, Maplewood; Allen L. Griggs, St. Paul; Kent S. Tarbutton, Lake Elmo, all of Minn.

[73] Assignee: Minnesota Mining and Manufacturing Company, St. Paul, Minn.

[21] Appl. No.: 420,087

[22] Filed: Apr. 11, 1995

[51] Int. Cl.$^6$ ............ B32B 27/28; C08G 8/28; C08F 283/00

[52] U.S. Cl. ............ 428/414; 428/416; 427/207.1; 427/372.2; 525/504; 525/505; 525/523; 528/90; 528/93; 528/381; 528/390; 523/453; 523/461

[58] Field of Search ............ 525/504, 505, 525/523; 528/90, 93, 381, 390, 414; 428/416; 523/453, 461; 427/207.1, 372.2

[56] References Cited

U.S. PATENT DOCUMENTS

| | | | |
|---|---|---|---|
| 3,257,342 | 6/1966 | Kwong | 260/18 |
| 3,287,154 | 11/1966 | Haas | 117/36.9 |
| 3,394,042 | 7/1968 | Wingert et al. | 161/6 |
| 3,492,145 | 1/1970 | Hurd | 117/36.2 |
| 3,496,250 | 2/1970 | Czerwinski | 260/836 |
| 3,516,846 | 6/1970 | Matson | 117/36.2 |
| 3,558,341 | 1/1971 | Phillips | 117/36.2 |
| 3,632,377 | 1/1972 | Williams | 117/36.2 |
| 3,935,960 | 2/1976 | Cornell | 220/260 |
| 3,949,090 | 4/1976 | Chalupa et al. | 424/320 |
| 4,048,374 | 9/1977 | Kotzsch et al. | 428/457 |
| 4,068,052 | 1/1978 | Weimer et al. | 526/62 |
| 4,131,517 | 12/1978 | Mitsuo et al. | 204/27 |
| 4,201,404 | 5/1980 | Carbonneau et al. | 282/27.5 |
| 4,213,872 | 7/1980 | Cooper | 430/114 |
| 4,219,638 | 8/1980 | Waddill et al. | 528/421 |
| 4,262,106 | 4/1981 | Frauenglass et al. | 526/317 |
| 4,452,291 | 6/1984 | Shemenski et al. | 152/359 |
| 4,525,181 | 6/1985 | Böckman | 55/71 |
| 4,572,888 | 2/1986 | Maeda et al. | 430/288 |
| 4,656,308 | 4/1987 | Schirmann et al. | 560/170 |
| 4,668,736 | 5/1987 | Robins et al. | 525/65 |
| 4,842,456 | 6/1989 | Foust et al. | 428/458 |
| 4,908,273 | 3/1990 | Urech et al. | 525/438 |
| 4,963,457 | 10/1990 | Matsushita et al. | 430/138 |
| 5,043,244 | 8/1991 | Cairncross et al. | 430/247 |
| 5,055,544 | 10/1991 | Harris et al. | 528/59 |
| 5,109,098 | 4/1992 | Harris et al. | 528/78 |
| 5,143,999 | 9/1992 | Setiabudi et al. | 525/504 |
| 5,260,357 | 11/1993 | Sachdeva | 525/530 |
| 5,376,451 | 12/1994 | Albin et al. | 428/402.2 |

FOREIGN PATENT DOCUMENTS

| | | |
|---|---|---|
| 2246025 | 9/1972 | Germany. |
| 5163475 | 6/1993 | Japan. |
| 983582 | 2/1965 | United Kingdom. |
| 1132573 | 11/1968 | United Kingdom. |

OTHER PUBLICATIONS

Lee et al., Handbook of Epoxy Resins, McGraw Hill, 1982 Reissue, pp. 7–1 to 7–3 and 10–16.

"Shieldex Product Literature", GRACE Davison, Baltimore, MD, (7 pages).

Maule, M.L., "Ion-Exchanged Silica Alternative to Chromate for Corrosion Inhibition", GRACE Davison, Baltimore, MD, (10 pages).

T. Fletcher, "Ion-exchanged silicas as alternatives to strontium chromate in coil coating primers", Polymers Paint Colour Journal, (6 pages).

Journal of Polymer Science: Part A: Polymer Chemistry, vol. 27, 1989, pp. 3237–3250, XP002003477, M. Chanda, E.A.: "Attaching Chelating Ligands to Polybenzimidazole via Epoxidation to Obtain Metal Selective Sorbents".

Xue, Gi, et al., "Surface Reaction of 2-Mercaptobenzimidazole on Metals and its Application in Adhesion Promotion", J. Chem. Soc. Faraday Trans., 87(8), pp. 1229–1232 (1992).

V. Brytus, "A New Approach for Low VOC Epoxy Coatings", *Modern Paint and Coatings*, vol. 74, No. 10, p. 172 (1984).

*Primary Examiner*—Randy Gulakowski
*Attorney, Agent, or Firm*—Scott A. Bardell

[57] ABSTRACT

The invention provides a curable, structural epoxy adhesive composition comprising: (a) an epoxy resin; (b) a curing agent for the epoxy resin; and (c) a compound of the formula I:

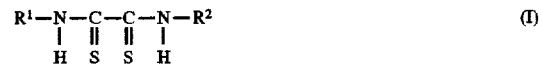

in which $R^1$ and $R^2$, which may be the same or different, are selected from an alkyl group, a hydroxyalkyl group, a cycloalkyl group, an aryl group, an arylalkyl group, or a heterocyclic group in which the one to three non-carbon atoms in the ring are independently selected from S, N, and O.

13 Claims, No Drawings

EPOXY ADHESIVES WITH DITHIOOXAMIDE ADHESION PROMOTERS

FIELD OF THE INVENTION

This invention relates to structural adhesive compositions containing one or more epoxy resins and one or more dithiooxamides (DTO's).

BACKGROUND OF THE INVENTION

Curable epoxy resin structural adhesive compositions are commonly used to bond metal parts. This practice has become more prevalent in the automobile industry, particularly with the increased demand for quietness, because seam bonding reduces or eliminates squeaks and enhances body rigidity. Due to production techniques and schedules, the performance requirements of such adhesives are demanding. For example, the metal surfaces are typically coated with mill oil. Additionally, more metal components are being galvanized as a corrosion prevention measure. The zinc-rich surface of galvanized parts is difficult to adhere to.

Many epoxy structural adhesive/metal constructions are deleteriously affected by prolonged water immersion or high humidity conditions, particularly when dissolved salts are present. While this reduction in bond integrity may occur in part due to the hydrophilic nature of many epoxy resins, which often absorb water with some resultant plasticization of these resins, a catastrophic adhesive bond failure mode may arise. One mode of catastrophic adhesive bond failure occurs when absorbed water migrates to the polymer/metal interface where it disrupts hydrogen bonding and acid base interactions, which are well known to contribute to adhesiveness. Various relatively hydrophobic and/or highly crosslinkable epoxy resins are available, but these are often expensive and difficult to apply, and often tend to be brittle when fully cured. In some cases these resins have relatively low cohesive energy density or are too soft, so that inherent bond strength is lacking.

Substituted dithiooxamides are known to have been used as color formers in carbonless copy papers, due to the deep blue color formed when the compounds the late with nickel. The technology is described in U.S. Pat. Nos. 4,201,404, 3,935,960, 3,632,377, 3,492,145, 3,394,042, and 3,287,154.

In recent years, some patents have been issued which describe the use of substituted dithiooxamides and other agents to improve the adhesion of certain polymers to cleaned copper and brass surfaces. U.S. Pat. No. 4,842,946 (Foust et al.) describes the use of carbonyl and thiocarbonyl compounds in primer solutions applied to polyimide films for improving the adhesion of electrodeposited copper onto the polyimides. Alkyl dithiooxamides, e.g., dimethyldithiooxamide and didodecyldithiooxamide are listed as suitable agents. U.S. Pat. No. 4,452,291 (Schemenski et al.) describes automobile tire constructions in which brass and/or zinc coated steel cords are coated with any of four different compositions, one of which contains optionally, dithiooxamide. Increased surface protection of the brass-coated steel before encapsulation is described, along with improved agent adhesion, and in many cases, improved initial adhesion of vulcanized brass-coated steel/rubber composites. U.S. Pat. No. 4,572,888 (Maeda et al.) describes the use of thiohydrazides and carbothio acid amides, including several examples of substituted DTO's added to a photopolymerizable compound comprising a presolubilized blend of a thermoplastic binder polymer and one or more photopolymerizable ethylenically unsaturated compounds such as various acrylate monomers. These compositions are dried and used as dry film photoresists featuring improved adhesion to the base metal, which was copper in the examples.

Xue, Gi, et al., J. Chem. Soc. Faraday Trans., 87(8), pp. 1229-1232 (1992) describes chemisorption of 2-mercaptobenzimidazole onto a chemically cleaned surface of metallic copper. This treatment of the copper is described to improve the adhesion of an epoxy resin to the copper.

Although the adhesion promoting qualities of various compounds in various types of adhesives and coatings have been investigated, there is a need for a compound that increases the adhesion of epoxy resins.

SUMMARY OF THE INVENTION

Accordingly, the present invention provides a curable, structural epoxy adhesive composition comprising:

(a) an epoxy resin;

(b) a curing agent for the epoxy resin; and (c) a compound of the formula I

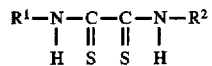
(I)

in which $R^1$ and $R^2$, which may be the same or different, are selected from an alkyl group, a hydroxyalkyl group, a cycloalkyl group, an aryl group, an arylalkyl group, or a heterocyclic group in which the one to three non-carbon atoms in the ring are independently selected from S, N, and O. The compositions of the invention are particularly useful for adhering to oily metal.

The invention also provides a method of bonding to oily metal comprising (i) applying the composition described above to an oily metal substrate and (ii) curing the composition. The invention also encompasses a construction comprising two steel substrates bonded together with the composition described above.

Additional features and advantages of the invention will be set forth in the description which follows, and in part will be apparent from the description, or may be learned by practice of the invention. The objectives and other advantages of the invention will be realized and attained by the methods and articles particularly pointed out in the written description and claims hereof.

It is to be understood that both the foregoing general description and the following detailed description are exemplary and explanatory and are intended to provide further explanation of the invention as claimed.

DETAILED DESCRIPTION OF THE INVENTION

The present invention provides epoxy adhesive compositions that are useful as structural adhesives. The adhesives are particularly useful for metal substrates such as steel.

Specifically, the invention provides a curable, structural epoxy adhesive composition comprising:

(a) an epoxy resin;

(b) a curing agent for the epoxy resin; and (c) a compound of the formula I

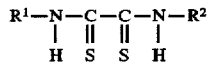
(I)

in which $R^1$ and $R^2$, which may be the same or different, are selected from an alkyl group, a hydroxyalkyl group, a cycloalkyl group, an aryl group, an arylalkyl group, or a heterocyclic group in which the one to three non-carbon atoms in the ring are independently selected from S, N, and O.

In preferred embodiments, the alkyl group has from 1 to 18 carbon atoms; the hydroxyalkyl group has from 1 to 18 carbon atoms; the cycloalkyl group has from 4 to 8 carbon atoms in the cyclic portion; and the alkyl group of the arylalkyl group has from 1 to 18 carbon atoms. In preferred embodiments, the aryl group is benzyl or a substituted benzyl group; and the aryl portion of the arylalkyl group is a benzyl or substituted benzyl group. The DTO's are preferably chosen to be soluble in the adhesive composition.

In a preferred embodiment, the adhesive composition comprises 10 to 50 percent by weight of the epoxy resin. It is preferred that the composition have a higher T-peel adhesion value to a steel surface coated with 150 mg/f² of oil than an otherwise identical composition without component (c).

In another preferred embodiment, $R^1$ and $R^2$ of formula I are selected from an alkyl group, hydroxyalkyl group, or cycloalkyl group. In other preferred embodiments, $R^1$ and $R^2$ are both cyclohexyl groups or $R^1$ and $R^2$ are both hydroxyethyl groups.

As noted above, this invention comprises the use of dithiooxamides as adhesion promoters in epoxy coatings and adhesives. These materials have been found to enhance the adhesion of epoxy compositions to steel and coated steels such as oily, cold rolled steel, electrogalvanized steel, hot dipped galvanized steel, hot dipped galvannealed steel, or electrogalvannealed steel. The dithiooxamides are useful as adhesion promoters in two component amine cured epoxy adhesives, and one component epoxy adhesives, and in one component and two component epoxy coatings. The dithiooxamides are preferably used at a concentration of 0.5 to 25 phr, more preferably 0.5 to 8 phr, and more preferably 1 to 3 phr. The term "phr" means parts by weight per hundred parts by weight of epoxy resin. Dithiooxamides and methods for their preparation are described in U.S. Pat. No. 3,558,341.

In a preferred embodiment, the dithiooxamide compounds are incorporated into a two component epoxy formulation by dissolution into the accelerator or curative sides of the two component epoxy formulation. The accelerator and the base (epoxy) components are mixed together, applied to the substrate, and cured.

Structural adhesives form strong integral bonds between substrates. Bonds formed with structural adhesives have a room temperature bond strength, as measured by a test well known in the industry, referred to as a T-peel test, of at least 10 pounds per lineal inch (pli) on a bond line thickness of 0.010 inch (0.25 mm). The upper limit on the structural bond strength would be the cohesive failure of the substrate or yielding of the substrate. The adhesive compositions of the present invention form room temperature T-peel bond strengths on a bond line thickness of 0.010 inch (0.254 mm) of at least 12 pli (pounds per lineal inch), with preferred compositions having bond strengths greater than about 20 pli, and the most preferred compositions having bond strengths greater than 25 pli.

Structural adhesive bonds can also be characterized by a room temperature modulus, as measured by a test known in the industry as the overlap shear test, of at least 3 megaPascals (MPa). The upper limit of the overlap shear strength would be the cohesive failure of the substrate, or yielding of the substrate. The adhesive compositions of the invention form bonds with overlap shear strengths at room temperature of at least 5 MPa, with preferred compositions forming overlap shear strength bonds of at least 7 MPa, and with the more preferred compositions forming overlap shear strength bonds of at least 10 MPa, and with the most preferred compositions forming overlap shear strength bonds of at least 14 MPa.

Structural bonds typically have a thickness greater than 2 mils (0.5 mm). In the practice of the invention, bond lines formed are typically greater than 5 mils (0.127 mm), and usually about 10 mils (0.254 mm).

Epoxies that are useful in the adhesive composition of the present invention can be any organic compound having at least one epoxy ring that is polymerizable by ring opening. Preferred are organic compounds having an average epoxy functionality greater than one, and preferably at least two. The epoxides can be monomeric or polymeric, and aliphatic, cycloaliphatic, heterocyclic, aromatic, or mixtures thereof. The more preferred epoxides are aromatic and contain more than 1.5 epoxy groups per molecule and most preferably more than 2 epoxy groups per molecule.

The useful materials have a molecular weight of about 150 to 10,000 and preferably from about 300 to 1,000. Useful materials include linear polymeric epoxides having terminal epoxy groups (e.g., a diglycidyl ether of a polyoxyalkylene glycol), polymeric epoxides having skeletal epoxy groups (e.g., polybutadiene polyepoxy), and polymeric epoxides having pendant epoxy groups (e.g., a glycidyl methacrylate polymer or copolymer), and mixtures thereof.

Useful epoxide containing materials include compounds having the required molecular weight of the general Formula I:

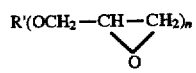

wherein:

R' is alkyl, alkyl ether, or aryl, preferably aryl and n is an integer between 2 and 6. Preferred are aromatic glycidyl ethers such as those prepared by reacting a polyhydric phenol with an excess of epichlorohydrin. Examples of useful phenols include resorcinol, catechol, hydroquinone, and the polynuclear phenols including p,p'-dihydroxydibenzyl, p,p'-dihydroxydiphenyl, p,p'-dihydroxydiphenyl sulfone, p,p'-dihydroxybenzophenone, 2,2'-dihydroxy-1,1-dinaphthylmethane and the 2,2', 2,3', 2,4', 3,3', 3,4' and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylmethane, dihydroxydiphenyltolylmethylmethane, dihydroxydiphenyldicyclohexylmethane, and dihydroxydiphenylcyclohexane. Also preferred are polyhydric phenolic formaldehyde condensation products as well as polyglycidyl ethers that contain as reactive groups only epoxy groups or hydroxy groups.

Compounds of the above general Formula I, but wherein n=1, are useful as optional additives in the composition of the instant invention so long as, in the preferred embodiment, the average epoxy functionality relative to the total number of epoxy compounds employed is greater than one.

Useful materials include diglycidyl ethers of bisphenol A and of novolak resins, such as described in "Handbook of Epoxy Resins" by Lee and Neville, McGraw-Hill Book Co., New York (1967), incorporated herein by reference. Epoxides with flexibilized backbones are also useful. Preferred materials include diglycidyl ethers of bisphenol A and diglycidyl ethers of bisphenol F, and most preferably diglycidyl ethers of bisphenol A, because of the desirable structural adhesive properties that these materials attain upon curing.

Examples of commercially available epoxides useful in the invention include diglycidyl ethers of bisphenol A (e.g., those available under the trademarks Epon 828, Epon 1001, and Eponex 1510 from Shell Chemical Co., and DER-331, DER-332, and DER-334 available from Dow Chemical Co.); diglycidyl ethers of bisphenol F (e.g., Epiclon™830 available from Dai Nippon Ink and Chemicals Inc.); silicone resins containing diglycidyl epoxy functionality; flame retardant epoxy resins (e.g., DER 580, a brominated bisphenol type epoxy resins available from Dow Chemical Co.); and 1,4-butanediol diglycidyl ethers.

In a preferred embodiment of the invention, a base curing agent is used in an amount sufficient to cure the epoxy adhesive composition. The amount can vary from an approximate stoichiometric amount based on the type of epoxy resin used to an excess of either the epoxy or the base curative, depending upon the end use of the epoxy adhesive. The amount typically ranges from about 1.5 to 200 parts by weight of curing agent per 100 parts of the total amount of epoxide used. Preferably, the base curing agent will be present in an amount of about 2.5 to 75 parts by weight of the curing agent per 100 parts of epoxide.

The base curing agent contains at least one nucleophilic or electrophilic group which reacts with the epoxy ring to cross-link the adhesive composition. Suitable base curing agents include polyamide resins, aliphatic amines, polyether diamines, aromatic amines, polyamines, polyamidoamines, polyetherdiamines, phenol compounds, and mercaptan resins. Examples of primary amines include di-(4-aminophenyl)sulfone, di-(4-aminophenyl)-ethers, and 2,2-bis(4-aminophenyl)propane, ethylene diamine, hexamethylene diamine, isomers of hexamethylene diamine, diethylene triamine, triethylene tetmmine, tetraethylene pentamine, bishexamethylene triamine, N,N'-Bis (3-aminopropyl)-1,2-ethane diamine, N-(3-Aminopropyl)-1,3-propane diamine N-(2-aminoethyl)-1,3 propane diamine, isomers of cyclohexane diamine, 4,4'-methylene biscyclohexanamine, 4'4'-methylene bis[2-methylcyclohexanamine], isophorone diamine, and phenalkylene polyamines. Examples of useful tertiary amines are dimethylaminopropylamine and pyridine.

Examples of useful aromatic amines include di-(4-aminophenyl)sulfone, di-(4-aminophenyl) ether, 2,2-bis(4-aminophenyl propane, 4,4 '-diamino diphenylmethane, 3,3'-dimethyl-4,4'-diaminodiphenyl methane, m-phenylene diamine, p-phenylene diamine, m-xylylene diamine, toluene diamine, 4,4'-methylene dianiline, benzidine, 4,4'-thiodianiline, 4-methoxy-1,3-phenyldiamine, 2,6-diaminopyridine, and dianisidine.

Examples of polyether diamines include 4,9-dioxadodecane-1,12-diamine, 4,7,10-Trioxatridecane-1,12-diamine, bis(3-amino propyl)polytetrahydrofurans of varying molecular weights, and commercially available from Texaco Chemical Co. under the Jeffamine trade name as D230, D400, D2000, and T403.

Suitable polyamido amines are the reaction products of polyamines and dimer acids. Dimer acids are prepared by dimerizing $C_{18}$ or $C_{22}$ fatty acids from vegetable oils or animal fats. The dimer acids are then reacted further with polyamines by a condensation reaction to produce the polyamido amine oligomers. These oligomers are described by V. Brytus, *Modern Paint and Coatings* Vol. 74, No.10, p. 172 (1984). These suitable polyamides are commercially available or may be prepared as disclosed in U.S. Pat. No. 3,257,342 (Kwong). The curing agents disclosed in U.S. Pat. No. 3,257,342 (Kwong) are amino-terminated polyamides that are the reaction product of a diaminopolyether and a polycarboxylic acid. Preferred carboxylic acids include dimer fatty acids or a mixture of dimer and trimer fatty acids. These carboxylic acids are available from Henkle Corporation under the Empol™tradename, and include Empol™1022, Empol™1018, Empol™1014, and Empol™1061.

The polyamidoamines can also be prepared as follows:

(1) Charge the acid to a reactor and heat to about 75 C. to about 100 C. under a low vacuum of about −28 inches Hg.

(2) Charge amine to the reactor under reduced pressure.

(3) Add nitrogen to bring reactor to atmospheric pressure.

(4) Heat slowly to about 175 C., distilling the water of reaction during heating.

(5) At about 175 C. to about 200 C., apply a vacuum of about −25 to about −40 inches Hg and distill for about an hour.

(6) Add nitrogen to bring reactor to atmospheric pressure and discharge product.

Examples of phenol compounds include phenol, substituted alkyl phenols (nonyl phenol), diphenols such as catechol, and alkyl substituted catechol, resorcinol, and hydroquinone.

Examples of mercaptan resins include alkyl dimercaptans such as ethane dithiol, nonane dithiol, pentaerythritol tetra (3-mercapto propionate), trimethylol propane tri(3-mercapto propionate), glycol dimercapto acetate, thiol terminated polyethers and thiol terminated polysulphides.

Also useful are boron complexes, and in particular, boron complexes with monoethanolamine; imidazoles such as 2-ethyl-4-methyl imidazole; guanidines such as tetmmethyl guanidine; substituted ureas such as toluene diisocyanate urea; dicyandiamide; and acid anhydrides such as 4-methyltetrahydroxyphthalic acid anhydride, 3-methyltetrehydroxyphthalic acid anhydride, and methylnorbornenephthalic acid anhydride. Mixtures of more than one curative may be used. Preferred curatives for one-part adhesive compositions are amines, acid anhydrides, guanidines, dicyandiamide, and mixtures thereof.

Specific examples of base curing agents are Ancamide™Series, commercially available from Air Products and Chemical Company, and the Scherex Series, commercially available from Schering-Berling.

Accelerators known in the art can also be added to increase the cure rate of the epoxy adhesive. Such accelerators include compounds that can act as a curative when used alone, but when combined with a different class of curatives, will accelerate the curing of the epoxy adhesive composition. Examples of useful accelerators include phenolic compounds, tertiary amines, dicyandiamides, imidazole, substituted imidazole hexakis imidazole nickel phthalate complex, substituted ureas, and calcium trifluoromethylsulfonate.

These accelerators may be used alone or in combination together to accelerate the cure of an epoxy adhesive combination. Some examples of useful combinations include phenolic compounds with tertiary amines, dicyandiamides with imidazole and/or substituted imidazoles, dicyandiamides with substituted ureas, dicyandiamides with hexakis imidazole nickel phthalate complex, and calcium trifluoromethyl sulphonate with imidazoles. A preferred curing agent/ accelerator combination is toluene diisocyanate urea and dicyandiamide. The preferred amount of the accelerator is from about 0.2 to 10 phr.

The epoxy adhesive composition preferably includes a particulate ion exchange corrosion inhibiting additive. The additive particles are formed from an inorganic oxide of silica or alumina and have cations chemically bound to them that are useful for corrosion inhibition. A particularly useful cation is calcium ($Ca^{2+}$).

The additive particles will preferably have an average diameter of about 0.1 to 200 microns. More preferably, the particles have an average diameter of about 1 to 50 microns. Suitable additive particles include a calcium ion exchanged amorphous silica gel commercially available from W. R. Grace & Co. under the tradename "Shieldex".

The epoxy adhesive composition preferably includes a toughening agent, and in particular, a polymeric toughening agent or a combination of polymeric toughening agents. Useful toughening agents have an epoxide incompatible component substantially insoluble in the epoxy resin and an epoxide compatible component substantially soluble in the epoxy resin.

The toughening agents which are useful in the present invention include polymeric compounds having both a rubbery phase and a thermoplastic phase, such as graft copolymers having a polymerized diene rubbery core and a polyacrylate or polymethacrylate shell; graft copolymers having a rubbery core with a polyacrylate or polymethacrylate shell; and elastomeric particles polymerized in situ in the epoxide from free-radical polymerizable monomers and a copolymeric stabilizer.

Specific examples of useful toughening agents include graft copolymers having a polymerized diene rubbery backbone or core which is grafted to a shell of an acrylic acid ester or methacrylic acid ester, monovinyl aromatic hydrocarbon, or a mixture thereof, such as disclosed in U.S. Pat. No. 3,496,250. Preferable rubbery backbones comprise polymerized butadiene or a polymerized mixture of butadiene and styrene. Preferable shells comprising polymerized methacrylic acid esters are lower alkyl ($C_1$–$C_4$) substituted methacrylates. Preferable monovinyl aromatic hydrocarbons are styrene, alpha-methylstyrene, vinyltoluene, vinylxylene, ethylvinylbenzene, isopropylstyrene, chlorostyrene, dichlorostyrene, and ethylchlorostyrene.

Further examples of useful toughening agents are acrylate core-shell graft copolymers wherein the core or backbone is a polyacrylate polymer having a glass transition temperature ($T_g$) below about 0 C., such as polybutyl acrylate or polyisooctyl acrylate to which is grafted a polymer (shell) having a $T_g$ above 25 C. such as polymethylmethacrylate.

Still further examples of toughening agents useful in the invention are elastomeric particles that have a $T_g$ below about 25 C. and have been polymerized in situ in the epoxide before mixing with the other components of the composition. These elastomeric particles, commonly referred to as "organosols", are polymerized from free-radical polymerizable monomers and a copolymerizable polymeric stabilizer that is soluble in the epoxide. The free-radical polymerizable monomers are ethylenically unsaturated monomers or diisocyanates combined with co-reactive difunctional hydrogen compounds such as diols, diamines, and alkanolamines. Examples of these elastomeric particles are disclosed in U.S. Pat. No. 4,525,181.

Still other toughening agents are rubber modified liquid epoxy resins. An example of such a resin is Kraton™ RP6565 Rubber available from Shell Chemical Company. The modified epoxy resin is made from 85% by weight Epon™828 and 15% by weight of a Kraton™ rubber. The Kraton™ rubbers are known in the industry as elastomeric block copolymers.

Toughening agents can also include liquid epoxies, liquid amines, polyether diamines, polyhydroxyethers, polyvinylacetals, and liquid acrylonitrile butadiene polymers, butadiene/nitrile rubbers, carboxylated butadiene/ nitrile rubbers, amine-terminated butadiene/nitrile rubbers, carboxyl-terminated butadiene/nitrile rubbers and the amine or carboxyl terminated adducts of the polymers with epoxy resins. Amine-terminated and carboxyl-terminated butadiene-acrylonitrile rubbers are commercially available from B.F. Goodrich under the HYCAR tradename as ATBN and CTBN reactive liquid polymers. Combinations of toughening agents may also be used to enhance the properties of the cured epoxy adhesive.

The toughening agent is preferably used in an amount equal to about 3 to 35 parts by weight, and more preferably about 5 to 15 parts by weight per 100 parts by weight of the epoxy resin. The toughening agents of the present invention add strength to the composition after curing without interfering with curing. The toughening agent may or may not react with the epoxide.

In some cases reactive diluents may be added to control the flow characteristics of the adhesive composition. Suitable diluents have at least one reactive terminal end portion and preferably, a saturated or unsaturated cyclic backbone. Preferred reactive terminal ether portions include glycidyl ether and vinyl ether. Examples of suitable diluents include the diglycidyl ether of resorcinol, diglycidyl ether of cyclohexane dimethanol, diglycidyl ether of neopentyl glycol, triglycidyl ether of trimethylolpropane dipentene, and the divinyl ether of cyclohexanedimethanol. Commercially available reactive diluents are "WC-68" from Shell Chemical Company, and Rapicure™CHVE, a divinyl ether of cyclohexanedimethanol available from Allied-Signal Corp. of Morristown, N.J.

Various other adjuvants can be added to the epoxide composition to enhance properties of the composition before and after curing.

Included among useful adjuvants are nonreactive diluents; plasticizers such as conventional phosphates and phthalates; flame retardants such as borates, metaborates, aluminum hydroxide, magnesium hydroxide, and bromine compounds; thixotropic agents such as fumed silica to provide flow control; pigments to enhance color tones such as ferric oxide, brick dust, carbon black, and titanium dioxide; fillers such as talc, silica, magnesium, calcium sulfate, beryllium aluminum silicate; clays such as bentonite; glass and cermmic beads and bubbles; compounds imparting X-ray opacity, such as barium metaborate; and reinforcing materials, such as woven and nonwoven webs of organic and inorganic fibers such as polyester, polyimide, glass fibers, and cermmic fibers. Dispersing agents and wetting agents, such as silanes, can also be added so long as they do not interfere with the curing reaction of the epoxy adhesive composition. The adjuvants can be added in an amount effective for the intended purpose; typically, amounts up to about 50 parts of adjuvant per total weight of formulation can be used.

The epoxy adhesive composition of the present invention may be formulated in a variety of ways, including one-part and two-part adhesive systems. By providing a two-part composition, with the two parts being combined prior to use of the composition, desirable shelf-life or pot-life of the composition is obtained. In some applications, it is desirable to select the amounts and the distribution of the ingredients in each part to provide viscosity control and better mixing of the two parts. For example, the fillers can be divided so that each part contains a portion of the fillers used.

The epoxy compositions of the present invention can be cured by any means which allow sufficient heat to start the curing reaction. The means of curing can include conventional ovens, induction heating, infrared radiation, microwave radiation, immersion into liquid baths, or any combination thereof. For two part adhesive compositions, the curing can be effected at room temperature for about 24 hours. Typically, the final curing is conducted at a temperature in the range of about 15 C. to about 230 C. for a time ranging from about 1 second to about 2 hours. Curing may be done in several stages, e.g., induction curing for 30 seconds, and oven curing at 215 C.

The curing time will depend upon the particular process for curing. Induction heating times typically range from about 1 to 60 seconds while oven curing times can range from about 0.1 to about 2 hours.

The epoxy adhesive compositions of the present invention are especially useful for bonding metal to metal and plastic to metal, although it can be used for bonding only plastic surfaces. Examples of metal surfaces include steel, titanium, oily steel, aluminum, and magnesium. Plastic surfaces include sheet molding compounds, polyethylene, polycarbonate, polyester, polyurethane, acrylonitrile butadiene styrene, and ureaformaldehyde. The epoxy adhesive can be used in assembling parts such as for automobiles, aircraft, refrigeration units, etc.

The following non-limiting examples serve to further illustrate the present invention in greater detail.

TEST PROCEDURES

T-Peel Adhesion Test

Two strips of steel (G60 HDGS) which meet ASTA619/A619M-82 and measure 25.4 mm by 203 mm by 0.8 mm were degreased with methyl ethyl ketone. The cleaned coupons were then oiled on one surface with an automotive draw lubricant. The automotive drawing lubricants used in this testing were Novamax FB27MC-1 from Novamax Technologies, Livonia, Mich., and Quaker 61 MAL-HCL, from Quaker Chemical Corporation, Detroit, Mich. The coating weight of the Novamax FB27MC-1 used was 150+/−30 mg/ft$^2$. The coating weight of the Quaker 61 MAL-HCL was 400+/−25 mg/ft$^2$. The automotive drawing lubricant was applied to the steel coupon by the following method. An Eppendorf repeater pipettor was used to discharge a known volume of the draw lubricant onto the surface of one side of the steel coupon (16 microL of 61 MAL-HCL; droplets were smeared over the surface of one side of the coupon with a natural rubber gloved finger that had been saturated with the draw lubricant in question. Coupons coated with the Novamax FB27MC-1, which is a water based emulsion draw lubricant, were allowed to dry at ambient conditions for 24 hours to allow the excess water to evaporate. Coupons coated with the Quaker 61 MAL-HCL, which is a nonemulsified draw compound, may be used immediately after coating.

The epoxy composition being tested was applied to the surface of the oiled coupons. The compositions that were tested have 0.5% to 1.0% by weight solid glass beads (0.25 mm diameter). The glass beads (which are obtained from Cataphote Corporation, Jackson, Miss.) were used as bondline spacers. One coupon was placed over the other with the adhesive sides facing. The mated coupons were then clamped and allowed to cure at 20 C. for 24 hours. The bonded T-peel samples were then postbaked at 163 C. for 20 minutes. The test samples were allowed to condition at 20 C. for 2 hours before bond strength testing. The peel strength was tested according to ASTM 1876-72, with the coupons being pulled apart at a crosshead speed of 5 cm per minute. The T-peel was measured in Newtons per centimeter and the mode of failure was noted as adhesive (A), wherein the adhesive pulled away from the surface of one of the coupons, cohesive (C), wherein the adhesive split, leaving adhesive on each of the coupons, or mixed (M), wherein both modes of failure were observed. The most preferred failure mode is 100% cohesive failure mode in which the adhesive is split substantially down the middle while leaving equal thicknesses of adhesive on each coupon. The T-Peel Adhesion test values indicated in the Examples are the average of 5 independent determinations.

Overlap Shear Strength

This test measures the ultimate strength that an epoxy adhesive composition will achieve after being fully cured.

Coupons (G60 HDGS) were cut to the dimensions of 25.4 mm by 10.2 mm by 0.8 mm and degreased with methyl ethyl ketone. The coupons were then coated with draw lubricants in the manner previously described. The epoxy adhesive composition being tested was spread over one end of an oiled coupon. The epoxy compositions that were tested had 0.5% to 1.0% by weight of 0.010 inch diameter solid glass beads, which act as bondline spacers. A second coupon was mated with the first to form a one half inch overlap. The mated coupons were then clamped and allowed to cure at 20 C. for 24 hours. The test coupons were then subjected to a postcure bake cycle at 163 C. for 20 minutes. The overlap shear strength was determined by pulling the coupons apart in the shear mode at a rate of 2 inches per minute (5.08 cm/min). The overlap shear strength was reported in megaPascals and the mode of failure was noted as adhesive (A), cohesive (C), or mixed (M). The most preferred failure mode is 100% cohesive failure mode in which the adhesive is split substantially down the middle while leaving equal thicknesses of adhesive on each coupon. The Overlap Shear Test values indicated in the Examples are the average of 5 independent determinations.

Salt Spray Test

The samples were subjected to a 5% salt spray at 35 C. according to ASTM B117-90 and tested after a certain number of hours, specifically 250 and 500 hours. The samples were removed from the salt spray chamber and conditioned at 20 C. and 50% relative humidity for 24 hours. Then the overlap shear strength was determined as described above.

EXAMPLES

Components used in the Examples

Epon™828 Epoxy Resin—diglycidyl ether of Bisphenol A having an epoxy equivalent weight of about 190 and an average molecular weight of 350 to 400, available from Shell Chemical Company.

Epon™1004 Epoxy Resin—high molecular weight Bisphenol A epichlorohydrin copolymer having an average epoxy equivalent weight of 875 to 1025, available from Shell Chemical Company.

Eponex™1510 Epoxy Resin—Hydrogenated version of Epon™828 having an average epoxy equivalent weight of 210 to 238, available from Shell Chemical Company.

MK 107—diglycidyl ether of cyclohexanedimethanol having an epoxy equivalent weight of about 160, available from Shell Chemical Company.

PY 322—aliphatic diglycidyl ether having an epoxy equivalent weight of 317 to 357, available from Ciba Geigy Corporation.

Paraloid™EXL2691 copolymer—acrylate/butadiene/styrene copolymer, available from Rohm & Haas Company.

Paraloid™753 copolymer—acrylate/butadiene/styrene copolymer available from Rohm & Haas Company.

Z-6040—silane adhesion promoter, available from Dow Chemical Company.

Shieldex—calcium ion exchanged silica gel, available from W.R. Grace Company.

GP7I silica-silicon dioxide filler having a particle size range from about 20 to 30 micrometers, available from Harbison-Walker Corp.

Cabosil™TS-720 silica—fumed silica available from Cabot Corp.

B37-2000 glass bubbles—glass bubbles, available from Minnesota Mining & Manufacturing Company.

glass beads—solid glass beads with 0.01 inch diameter, available from Cataphote Corp.

Cabot M120—carbon black, available from Cabot Corporation.

Cardolite 541—phenalkylene amine with an average amine hydrogen equivalent weight of 88, available from Cardolite Corp.

Hycar™1300×16—amine terminated acrylonitrile butadiene copolymer having an average amine hydrogen equivalent weight of 900, available from B.F. Goodrich Company.

Ancamine™K54—tris-2,4,6(dimethylaminomethyl) phenol, available from Air Products Corp.

Amicure CG1200—micronized dicyandiamide catalyst, available from Air Products Corp.

Example 1

A two component amine-cured epoxy adhesive that contains a DTO compound was prepared as follows.
Preparation of the Accelerator To prepare the accelerator composition, 43 phr of an amine-terminated polyamide (the reaction product of a diamine having the formula:

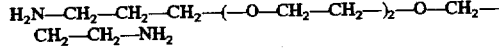

and a dimer acid mixture (Empol™1014, obtained from Henkel Corp.) in a 2:1 equivalents ratio) and the calcium nitrate (2 phr) were mixed and heated to 125 C. in a Meyers type mixer until a clear homogeneous solution was obtained. The Cardolite™541 (11.9 phr) and the N,N'-dicyclohexyldithiooxamide (2 phr) were added to the solution and dissolved with stirring at 125 C. The solution was then cooled to 80 C. and the Hycar™1300×16 (17.1 phr) and the Ancamine™K54 (7.2 phr) were added with stirring. The fillers, GP71 (10 phr) and the Cabosil™TS720 (1 phr), were added and dispersed with mixing until a smooth dispersion was obtained. The mixture was then vacuum degassed to remove entrapped air. The accelerator mixture was then packaged for later use.
Preparation of the Epoxy Base The Paraloid™EXL 2691 (15 phr) was mixed with the Epon™828 (80 phr) in a Meyers type mixer and heated to 70 C. with stirring until a smooth, homogeneous dispersion of the EXL 2691 in the epoxy resin was obtained. The mixer heat was turned off and the contents of the mixer were allowed to cool as the rest of the constituents were added. The MK 107 epoxy resin (20 phr) and the silane, Z-6040 (2.5 phr), were added to this dispersion with mixing. The fillers were added with mixing in the order listed: Shieldex™(5 phr), B37-2000 (22 phr), GP71 (20 phr), Cabosil™TS720 (2 phr), Cabot™120 (0.8 phr) and solid glass beads (3 phr). The contents of the mixer were mixed until a smooth dispersion was obtained. The mixture was then vacuum degassed to remove entrapped air and packaged for later use.

To form the reactive adhesive composition used to prepare the test bonds, 1.8 parts by weight of the epoxy base was mixed with 1.0 parts by weight of the accelerator. The reactive composition was applied to a test substrate, cured at 20 C. for 24 hours, post-cured at 163 C. for 20 minutes, cured at 20 C. for 1 hour, and further cured at 121 C. for 30 minutes. Test data is summarized in Table I.

Example 2

A one component epoxy adhesive that contains a DTO compound was prepared as follows. The epoxy resins, Epon™828 (50.2 phr) and Epon™1004 (17.9 phr) and the Paraloid™753 (12.5 phr) were mixed together in a Meyers type mixer and heated at 125 C. to form a smooth dispersion. Two additional epoxy resins, Ciba™PY322 (23.5 phr) and Eponex™510 (8.4 phr) were added to the dispersion and blended in. The adhesion promoter, N,N'-dihydroxyethyldithiooxamide (1.65 phr) was added to the mixer and dissolved at 125 C. The mixer was then cooled to 30 C. and the fillers were added with agitation in the order listed: Shieldex (4.4 phr), GP7I (37 phr), Cabosil™TS720 (2.9 phr). The mixer was cooled again to 20 C. and the epoxy catalysts, Amicure™CG1200 (5.7 phr) and nickel imidazole phthalate (2.3 phr) were added with agitation. The contents of the mixer were inspected to insure that a smooth dispersion had been attained and the mixture was vacuum degassed to remove entrapped air.

Test bonds were made by applying the adhesive obtained to the test substrate and curing at 170 C. for 40 minutes. Test data is summarized in Table II.

Comparative Example C-1

A two component amine-cured epoxy adhesive was prepared as follows. The accelerator was prepared exactly as in Example 1 except that no N,N'-dicyclohexyldithiooxamide was added. The epoxy base was prepared exactly as in Example 1. The reactive adhesive composition was formed, applied to a test substrate, and cured exactly as in Example 1. Test data is summarized in Table I.

Comparative Example C-2

A one component epoxy adhesive was prepared exactly as in Example 2 except that no N,N'-dicyclohexyldithiooxamide was added. The adhesive obtained was applied to a test substrate, cured, and tested exactly as in Example 2. Test data is summarized in Table II.

TABLE I

| Metal Substrate: G60 HDGS coated with 150 mg/ft² (dry weight) of Novamax FB27MC-1 | | |
|---|---|---|
| | Ex. 1 | Ex. C-1 |
| T-peel strength | 40 pli | 30 pli |
| % cohesive failure | 100% | 50% |
| OLS strength (initial) | 2700 psi | 2662 psi |
| OLS strength (250 hrs. salt spray) | 2400 psi | 2262 psi |
| % retention OLS strength | 88% | 85% |
| OLS strength (500 hrs. salt spray) | 2200 psi | 2000 psi |
| % retention OLS strength | 82% | 75% |

The two component formulation which contained the dithiooxamide compound (Example 1) showed enhanced T-peel strength, and the failure mode of the T-peel bonds of the adhesive of Example 1 were 100% cohesive failure mode. In contrast, the bond strength of the adhesive from Comparative Example C-1 was reduced and the failure mode was mixed—50% adhesive and 50% cohesive. The incorporation of the dithiooxamide compound in Example 1 also improved the environmental durability. Test samples bonded with the adhesive described in Example 1 retained 82% of the initial bond strength after 500 hours exposure to salt spray. The bonds did not exhibit any evidence of undercutting or corrosion within the bondline area. In contrast, the test sample bonded with the adhesive from Example C-1 showed only 75% retention of initial bond strength and there was evidence of undercutting at the edges of the bondline area.

TABLE II

| Metal Substrate: 70EG electrogalvanized steel with 400 mg/ft² of Quaker MAL-HCL draw oil | | |
|---|---|---|
| | Example C-2 | Example 2 |
| OLS Strength | 2556 psi | 2772 psi |
| % Cohesive Failure | 30% | 80% |

The incorporation of a dithiooxamide compound into the adhesive described in Example 2 increases the OLS strength and gives a higher percent cohesive failure mode compared to the corresponding adhesive in Comparative Example C-2.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What we claim is:

1. A curable, structural epoxy adhesive composition for bonding to oily metal comprising:
   (a) an epoxy resin;
   (b) a phenalkylene amine curing agent for the epoxy resin; and
   (c) a compound of the formula I

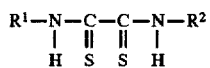

in which $R^1$ and $R^2$, which may be the same or different, are selected from an alkyl group, a hydroxyalkyl group, a cycloalkyl group, an aryl group, an arylalkyl group, or a heterocyclic group in which the one to three non-carbon atoms in the ring are independently selected from S, N, and O, wherein said compound of formula I is soluble in the adhesive composition and wherein said composition has a greater amount of cohesive failure when bonded to a steel surface coated with 150 mg/ft² of oil than an otherwise identical composition without component (c).

2. The composition of claim 1, further comprising an accelerator to increase the cure rate of the composition.

3. The composition of claim 1, further comprising a toughening agent.

4. The composition of claim 1, wherein $R^1$ and $R^2$ of formula I are selected from an alkyl group, hydroxyalkyl group, or cycloalkyl group.

5. The composition of claim 1, wherein $R^1$ and $R^2$ are both cyclohexyl groups.

6. The composition of claim 1, wherein $R^1$ and $R^2$ are both hydroxyethyl groups.

7. The composition of claim 1, wherein the compound of formula I is present at 0.5 to 25 phr.

8. The composition of claim 1, wherein the compound of formula I is present at 0.5 to 8 phr.

9. The composition of claim 1, wherein the compound of formula I is present at 1 to 3 phr.

10. The composition of claim 1, further comprising a particulate ion exchange corrosion-inhibiting additive.

11. A method of bonding to oily metal comprising (i) applying the composition of claim 1 to an oily metal substrate and (ii) curing the composition.

12. A construction comprising two steel substrates bonded together with the composition of claim 1.

13. An adhesive composition for bonding to oily metal comprising:
   (a) an aliphatic epoxy resin;
   (b) an aromatic epoxy resin;
   (c) a phenalkylene amine curing agent; and
   (d) a compound of the formula I

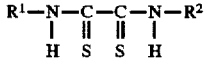

wherein said compound of formula I is soluble in the adhesive composition and wherein said composition has a greater mount of cohesive failure when bonded to a steel surface coated with 150 mg/ft² of oil than an otherwise identical composition without component (d).

* * * * *